US006953081B2

(12) United States Patent
Klingler et al.

(10) Patent No.: US 6,953,081 B2
(45) Date of Patent: Oct. 11, 2005

(54) HEAT EXCHANGER AND VEHICLE HEATING OR AIR-CONDITIONING SYSTEM INCLUDING SAME

(75) Inventors: Dietrich Klingler, Heubach (DE); Werner Schwahn, Schwieberdingen (DE)

(73) Assignee: Behr GmbH & Co., Stuttgart (DE)

( * ) Notice: Subject to any disclaimer, the term of this patent is extended or adjusted under 35 U.S.C. 154(b) by 325 days.

(21) Appl. No.: 10/115,891

(22) Filed: Apr. 5, 2002

(65) Prior Publication Data

US 2002/0144810 A1 Oct. 10, 2002

(30) Foreign Application Priority Data

Apr. 6, 2001 (DE) .......................... 101 17 400

(51) Int. Cl.$^7$ .......................... F25B 29/00; F28F 3/02; B60H 1/00
(52) U.S. Cl. .......................... 165/43; 165/42; 165/201; 165/122; 165/151; 165/152; 165/153; 165/170; 165/164; 165/167; 165/140; 165/130; 165/166; 165/148
(58) Field of Search .......................... 165/201, 42, 43, 165/122, 151, 152, 153, 170, 164, 167, 140, 130, 166, 148

(56) References Cited

U.S. PATENT DOCUMENTS

| | | | | |
|---|---|---|---|---|
| 976,203 A | * | 11/1910 | Mosher | 165/130 |
| 1,008,844 A | * | 11/1911 | McKeown | 165/130 |
| 1,057,294 A | * | 3/1913 | Streichert | 165/148 |
| 1,619,333 A | * | 3/1927 | Dann | 165/130 |
| 1,795,774 A | * | 3/1931 | Hart | 165/130 |
| 1,823,788 A | * | 9/1931 | Dewoitine | 165/170 |
| 1,863,056 A | * | 6/1932 | Kuenstler | 165/57 |
| 1,937,713 A | * | 12/1933 | Oakey | 165/183 |
| 2,036,704 A | * | 4/1936 | Kuenstler | 165/130 |
| 2,083,028 A | * | 6/1937 | Livar | 165/130 |
| 2,097,851 A | * | 11/1937 | Wenzl | |
| 2,196,318 A | * | 4/1940 | Maier | 165/130 |
| 2,877,000 A | * | 3/1959 | Person | 165/166 |
| 3,104,701 A | * | 9/1963 | Jacoby, Jr. | 165/130 |
| 3,428,141 A | * | 2/1969 | Forstner et al. | 165/166 |
| 5,511,612 A | | 4/1996 | Tajima et al. | |
| 5,896,916 A | | 4/1999 | Baechner et al. | |
| 6,085,832 A | | 7/2000 | Rehberg | |
| 6,161,616 A | | 12/2000 | Haussmann | |
| 2001/0018968 A1 | | 9/2001 | Klingler et al. | |

FOREIGN PATENT DOCUMENTS

| | | | | |
|---|---|---|---|---|
| DE | 841337 | * | 6/1952 | 165/130 |
| DE | 29 24 441 | | 12/1979 | |
| DE | 43 32 619 | | 3/1994 | |
| DE | 195 10 847 | | 9/1996 | |
| DE | 198 04 389 | | 8/1998 | |
| DE | 197 19 252 | | 11/1998 | |
| DE | 198 32 479 | | 1/2000 | |
| DE | 195 43 149 | | 9/2000 | |
| DE | 100 10 266 | | 11/2001 | |
| FR | 842632 | * | 6/1939 | 165/130 |
| GB | 635713 | * | 4/1950 | 165/148 |
| GB | 2 023 796 | | 1/1980 | |
| JP | 10-6759 | * | 1/1998 | |
| JP | 10-53021 | * | 2/1998 | |
| NL | 7513374 | * | 5/1977 | 165/148 |

* cited by examiner

Primary Examiner—John K. Ford
(74) Attorney, Agent, or Firm—Foley & Lardner LLP

(57) ABSTRACT

The invention relates to a plate-type heat exchanger, in which at least one first flow passage (16) for a first medium is provided between two plates (12 and 14), which form a plate pair (13). A plurality of second flow passages (18), which are connected in parallel, for a second medium are provided between two plate pairs (13). To provide a novel, improved heat exchanger, which is easier to produce, it is proposed that the second, parallel-connected flow passages (18) are formed in each case by one plate (14, 12) from adjacent plate pairs (13).

31 Claims, 4 Drawing Sheets

HEAT EXCHANGER AND VEHICLE HEATING OR AIR-CONDITIONING SYSTEM INCLUDING SAME

CROSS-REFERENCE TO RELATED PATENT APPLICATIONS

The right of priority under 35 U.S.C. §119(a) is claimed based on German Patent Application No. 101 17 400.4, filed Apr. 6, 2001, the entire disclosure of which is hereby incorporated by reference.

BACKGROUND OF THE INVENTION

The present invention relates to a plate-type heat exchanger and to a heating or air-conditioning system for a motor vehicle which is equipped with such a heat exchanger.

One known air-conditioning system, for example, disclosed in DE 198 04 389, has what is known as a plate-type evaporator. The evaporator has first flow passages that are formed, in each case, from one pair of plates, for a refrigerant of the air-conditioning system, and corrugated fins which are arranged between respectively adjacent plate pairs and around which the air which is to be cooled flows. Known plate evaporators of this type are of cuboidal structure and are fitted in the air-conditioning system between a blower and a heat exchanger for cooling the air which is to be directed into the passenger compartment.

Motor vehicles today are required to have external dimensions which are as compact as possible, while the interior should be as large as possible. Accordingly, it is an objective for the air-conditioning systems to be made increasingly compact, so that they require the minimum possible space. Therefore, it is attempted to make the individual components of the air-conditioning system smaller and more efficient, as shown, for example, in DE 197 19 252, in which the disclosed evaporator is designed in such a way that its total depth amounts to at most 50 mm.

SUMMARY OF THE INVENTION

One principal object of the present invention is to provide a novel, compact heat exchanger, in particular a heat exchanger suitable for air-conditioning applications. The heat exchanger should be easier to produce than known plate evaporators.

A further object of the invention is to provide a heating or air-conditioning system which is equipped with the improved heat exchanger and takes up less space.

In accordance with one aspect of the present invention, there has been provided a plate-type heat exchanger, comprising: a first and second plate pair comprised in each case of two plates which form and define between them at least one first flow passageway for a first heat exchange medium; and a plurality of second flow passageways which are connected in parallel for a second heat exchange medium, said second flow passageways being defined between two adjacent plate pairs, wherein the second flow passages are formed in each case by one plate from adjacent plate pairs.

In accordance with another aspect of the invention, there has been provided a heating or air-conditioning system for a motor vehicle having at least one heat exchanger of the type defined above. There has also been provided a motor vehicle containing the new heating or air-conditioning system.

Further objects, features and advantages of the present invention will become apparent from the detailed description of preferred embodiments that follows, when considered together with the accompanying figures of drawing.

DETAILED DESCRIPTION OF PREFERRED EMBODIMENTS

Figure 1:
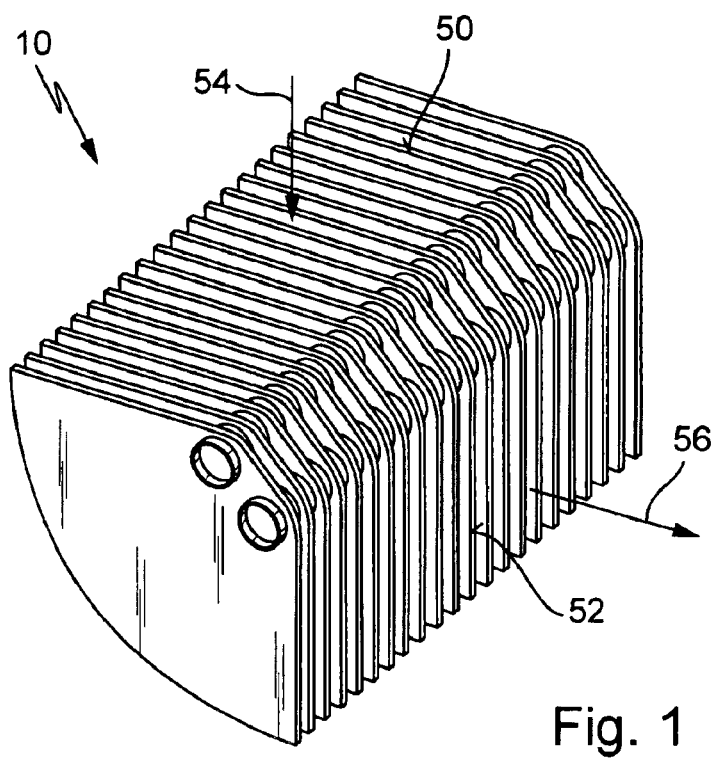
FIG. 1 is a diagrammatic illustration of a heat exchanger according to the invention, shown in perspective.

The heat exchanger according to the invention is of plate-type structure, in which at least one first flow passage for a first medium is provided between in each case two plates, and a plurality of second flow passages for a second medium, which are connected in parallel, are provided between, in each case, two plate pairs. The second, parallel-connected flow passages are formed by, in each case, one plate from adjacent plate pairs. This makes it possible to dispense with the known corrugated fins which were previously used to form the second flow passages. The plates are shaped to accomplish this purpose.

Production is simplified, since the entire heat exchanger can be built up simply by stacking the plates. Fine corrugated fins no longer have to be provided between the plate pairs, which also allows production costs to be reduced. A further advantage is that brazing points between plate and corrugated fin are dispensed with. This also eliminates the problems of good heat transfer associated with brazing points becoming detached, and consequently the heat transfer is improved.

Unlike the known corrugated fins, the second flow passages of the heat exchanger according to the invention can have a curved profile, so that the air can be diverted in a desired direction. As a result, a more compact structure is possible, in particular of the air-conditioning system containing the heat exchanger according to the invention. The heat exchanger is responsible both for the function of cooling or heating the air flowing through it and also for guiding the air in a particular direction. Consequently, means for diverting the air on the air side upstream and/or downstream of the heat exchanger can be dispensed with, at least to a certain extent. The heating or air-conditioning system, or the air-guiding housing of this system, can be of more compact design.

If the first flow passages that carry the first medium (which, when the heat exchanger is used as an evaporator, is an air-conditioning refrigerant) have a relatively small diameter, a further advantage is achieved that the area available for connecting adjacent plates is relatively large. This results in a high pressure stability of the first flow passages, which allows the heat exchanger to be used in an air-conditioning system using $CO_2$ as the refrigerant, or other refrigerants which operate at high pressures.

A very compact, pressure-stable heat exchanger, which can be produced at low cost, is then provided for use in an air-conditioning system with $CO_2$ as the refrigerant.

Advantageous configurations of the invention form the subject matter of various alternative embodiments.

In an arrangement which is favorable in terms of flow, the second flow passages preferably run in the form of an arc, in particular an arc of a circle. This means that the pressure losses for the air are low despite the diversion. In this case, an inflow surface and an outlet surface for the air may advantageously be arranged at an angle α with respect to one another. It is preferable for the angle α to be approximately 90°. A heat exchanger of this type makes it possible to construct compact air-conditioning systems. The size of the plates may be designed as desired, depending on the desired capacity and the space available.

It is preferable for one plate pair to form a plurality of first flow passages running hydraulically parallel to one another, so that a refrigerant which flows through the first passages controls the temperature of the plate pair as uniformly as possible over its entire extent. The passages are in this case of approximately equal length, in order to obtain approximately the same pressure drop in each passage. To optimize the heat exchange with the second medium, the first flow passages, at least in some regions, preferably run in meandering form.

In another advantageous design, on a first side the plates have passageway-like recesses which form the first flow passages, when adjacent plates are connected by means of their first sides to form a plate pair.

To improve the connection between adjacent plates which are connected by means of their first sides, in particular to obtain a high pressure-resistance of the first flow passages for $CO_2$ applications, at least one tongue-like web and at least one groove-like channel are arranged so as to run alongside the recesses. When the first sides are joined, the webs on one plate pass into the channels in the other plate, so that they rest accurately inside one another and can be joined to one another, preferably by brazing or adhesive bonding.

To form the second flow passages, the plates have webs which project from their second side. Adjacent plates can be connected to one another by means of the webs.

To reduce the number of different parts, respectively adjacent plates are designed virtually mirror-symmetrically. Only in their connecting regions are adjacent plates of complementary design, to allow optimum connection of the plates. In this case, in principle only two different types of plates are required to produce the heat exchanger.

During stamping of the plates, it is advantageously possible for indentations to be stamped into the downstream end of the second flow passages, whereby at these indentations water of condensation which forms can be drained off, when the heat exchanger is used as an evaporator. There is no need to provide special measures for draining condensate.

The plates preferably consist of aluminum or an aluminum alloy, so that the weight is minimized and good machinability is provided. It is also conceivable for the plates to consist of another nonferrous metal.

The heat exchanger according to the invention can be used particularly advantageously as an evaporator in an air-conditioning system which operates with $CO_2$ as refrigerant. The large-area brazing of adjacent plates by means of their first sides to form the first flow passages for the $CO_2$, and in particular the optionally provided interlocking channels and webs, mean that the evaporator is better able to withstand the high system pressures used in a $CO_2$ system. Furthermore, the space required can be reduced in the manner described above.

A very compact heating or air-conditioning system is produced if the heat exchanger diverts the air through approximately 90°.

The invention is explained in detail below in terms of a number of preferred exemplary embodiments, with reference to the accompanying figures of drawing.

Figure 3:
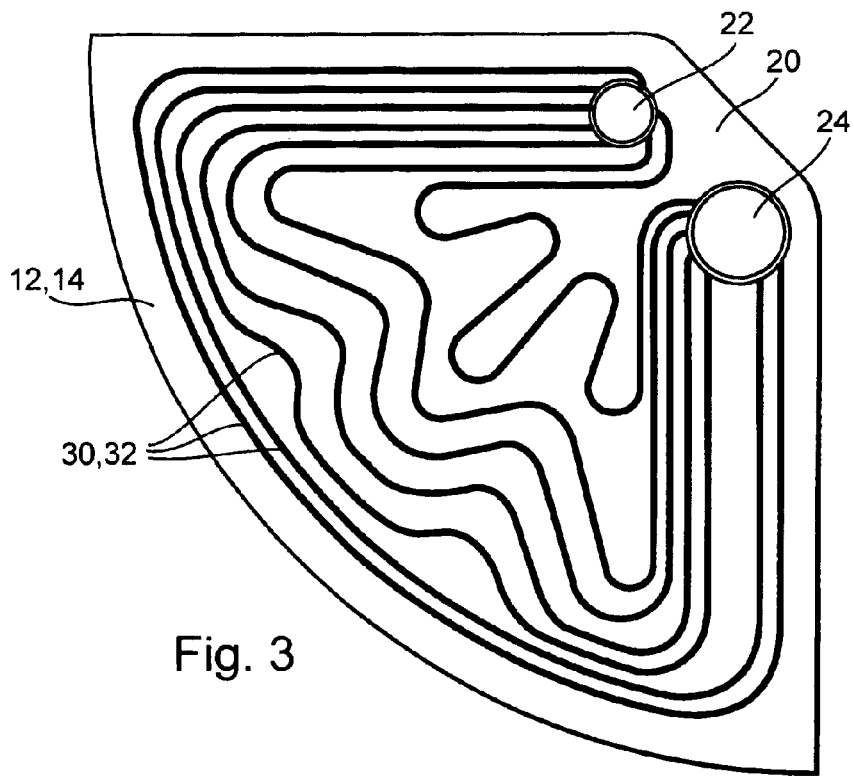
FIG. 3 is a plan view of a first side of a plate.

A heat exchanger 10 according to the invention, which is illustrated in the drawings, comprises first and second plates 12 and 14, which substantially form the entire heat exchanger by being alternately stacked on top of one another or arranged next to one another in a row and by adjacent plates being brazed or adhesively bonded to one another, so that first and second flow passages 16 and 18 are alternately formed. The heat exchanger 10 illustrated can preferably be used as an evaporator in a refrigerant circuit, and consequently the flow passages 16 are intended to carry a refrigerant and the flow passages 18 are intended to be traversed by air. The plates 12 and 14 are formed substantially mirror-symmetrically and have an external shape which, in the exemplary embodiment, approximately corresponds to quarter of a circle (FIG. 3).

At an end 20 which is adjacent to the center point of the circle, the plates 12 and 14 have two passage openings 22 and 24. Each passage opening 22 and 24 in each case has a collar 26 and 28, so that in the assembled state of the heat exchanger 10, the collars of adjacent plates can be joined to one another, in particular by brazing, so that the passage openings 22 and 24 which are aligned with one another in each case form a collection space for a first medium. The first medium is supplied to and discharged from the heat exchanger 10 by means of a feed connection and discharge connection (not shown in detail).

Figure 5:
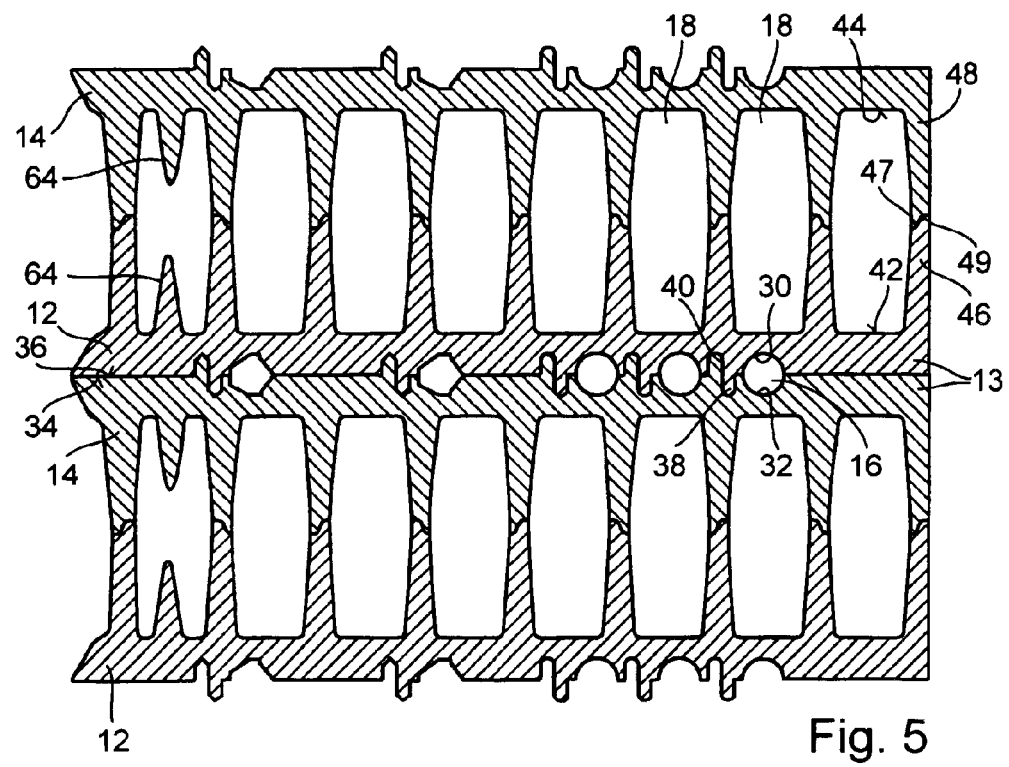
FIG. 5 is a cross section through four adjacent plates.

The first flow passages 16 are formed by passage-like recesses 30 and 32 on a first side 34 or 36, respectively, of the first and/or second plates 12 and 14 (FIG. 5). When adjacent plates 12 and 14 are connected by means of their first sides 34 and 36 to form a plate pair 13, the passage-like recesses 30 and 32 form the first flow passages 16.

To improve the connection, preferably a brazed joint, between the plates 12 and 14 on their first sides 34 and 36, at least one tongue-like web 38 and at least one groove-like channel 40 are provided running alongside the recesses 30 and 32. When the first sides 34 and 36 are being joined, the webs 38 on one plate 12 or 14 can fit accurately into the channels 40 in the other plate 14 or 12, and these components can be joined to one another, in particular by brazing (FIG. 5). In the connecting regions on the first sides 34 and 36, the plates 12 and 14 are therefore designed to be complementary to one another.

As can be seen from FIGS. 3 and 5, one plate pair 13 forms a plurality of the first flow passages 16, and the flow passages 16 in a plate pair are connected in parallel and preferably are of approximately the same length, for which purpose the flow passages 16 which run further toward the inside run in meandering form at least in certain regions.

On a second side 42 or 44 of the first and/or second plate 12 or 14, there are webs 46 or 48 which project from the second side (FIG. 5). Adjacent plates 12 and 14 are connected to one another, for example, by brazing or adhesive bonding, via the webs 46 and 48, the connection taking place along mutually complementary end edges 47 and 49 of the webs 46 and 48. The shape of the end edges is selected in such a manner that, when two plates 14 and 12 are placed on top of one another, they are automatically centered in a manner which facilitates assembly.

Figure 2:
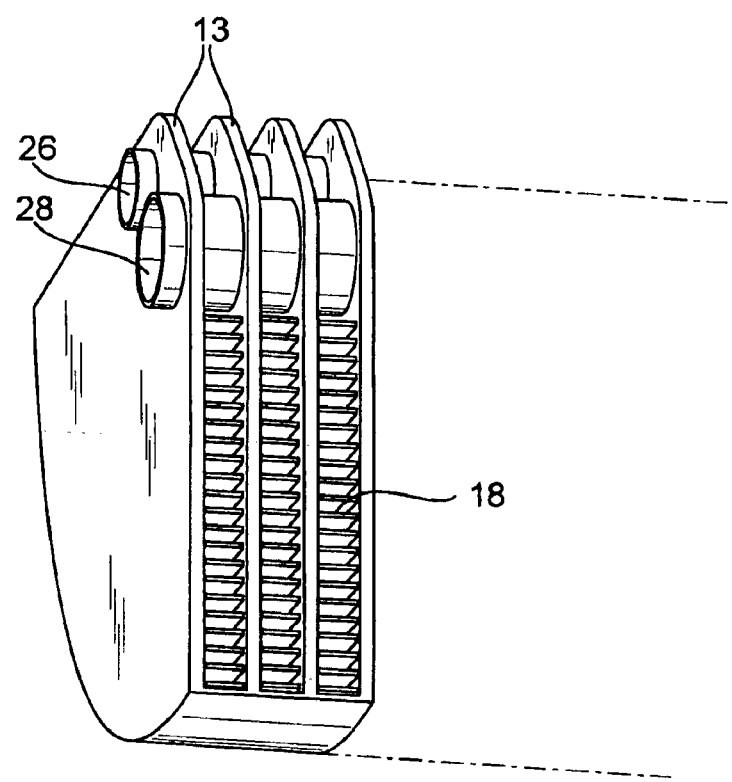
FIG. 2 is a partial region of the heat exchanger with four plate pairs, also shown in perspective.

The second flow passages 18 are formed by the plates 14 and 12, which have been connected to one another by means of their second sides 42 and 44, and the webs 46 and 48 (FIG. 5). The second flow passages 18, which are formed between two plate pairs 13, are connected in parallel and are open toward their ends, as can be seen in particular from FIG. 2.

Figure 4:
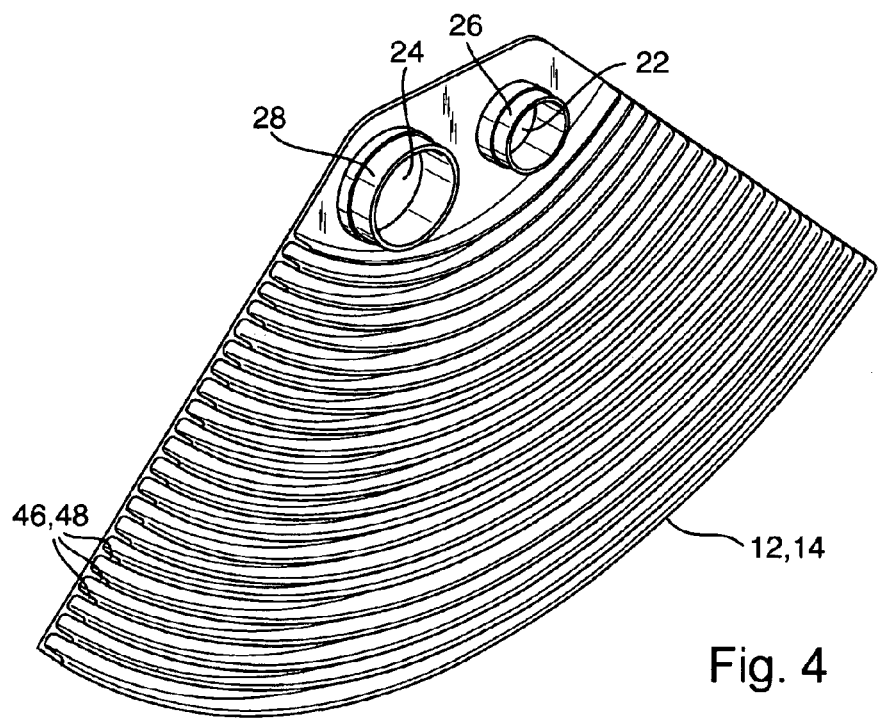
FIG. 4 is a perspective view onto a second side of the plate shown in FIG. 3.

In the exemplary embodiment illustrated, the second flow passages 18 are designed in the form of an arc, in particular an arc of a circle, so as to correspond to the external shape of the plates 12 and 14 (FIG. 4). In this arrangement, the individual second flow passages 18 are of different lengths and become longer as the distance from the inlet for the first medium, i.e., from the passage opening 22, increases. Consequently, in the vicinity of the inlet, where there is a relatively great temperature difference between the two media, the flow passages 18 are relatively short, and therefore the heat exchange only needs to take place over a relatively short path. At a greater distance from the inlet, where the temperature difference between the two media is lower, the flow passages 18 are advantageously longer, so that the air, which is guided in a certain flow passage 18 in the heat exchanger independently of the position of the second flow passage 18, is always brought to the same temperature level. In addition, additional fins 64 or other heat transfer shapes may be arranged in the shorter flow passages 18 which run close to the inlet, in order to improve heat exchange in the shorter flow passages, as indicated in FIG. 5 in the flow passage 18 which lies furthest to the left.

The ends of the flow passages 18 are on one side arranged at an air inflow side 50 and on the other side at an air outlet side 52 (FIG. 1). The air which flows in the direction 54 enters the flow passages 18 at the air inflow side 50 and, as it flows through the heat exchanger 10, undergoes a change in direction and emerges from the heat exchanger 10 at the air outlet side 52, in the direction 56. In the exemplary embodiment illustrated, the air outlet surface 52 is at an angle α of approximately 90° to the air inflow surface 50. Other angles are also entirely conceivable.

Figure 6:
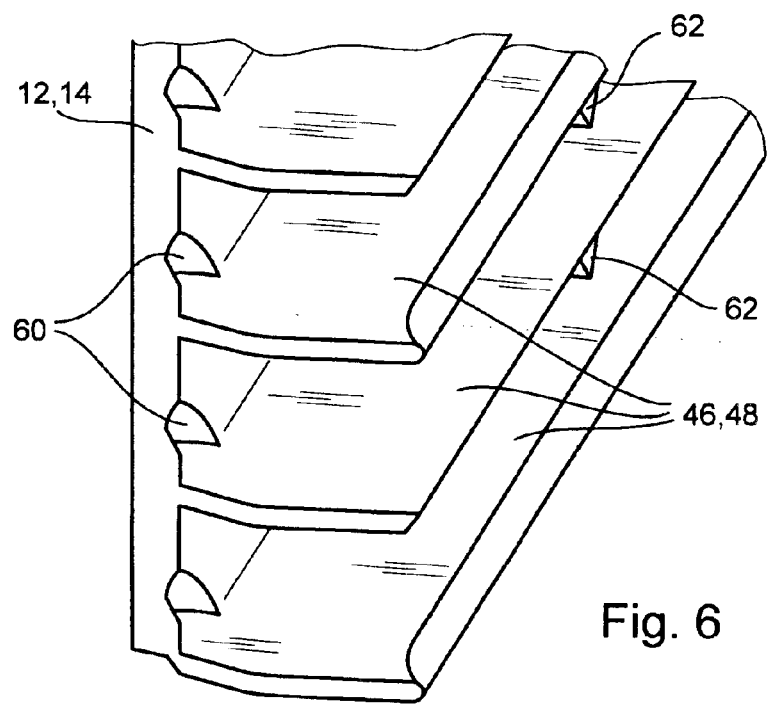
FIG. 6 is a perspective view onto outlet-side ends of second flow passages.

At those ends of the second flow passages 18 which are associated with the air outlet side 52, these passages have means for assisting the drainage of water of condensation. According to one embodiment, these means are integrated in the plates 12, 14, in the form of indentations 60, by means of which water of condensation deposited in the heat exchanger 10 can drain or drop off in an improved manner (FIG. 6). Naturally, the means for assisting the drainage of water of condensation may also be of any other suitable form. As can also be seen from FIG. 6, turbulence-generating means 62, which impart turbulence to the air flowing through the flow passages 18 and therefore provide improved heat transfer, may be arranged on the webs 46, 48.

The plates 12 and 14 of the heat exchanger 10 preferably consist of aluminum and are brazed to one another, an operation which can be carried out, for example, in a brazing furnace. The plates may also be adhesively bonded to one another and may also consist of another nonferrous metal.

Therefore, the heat exchanger 10 is constructed in an extremely simple way from only two different plates 12 and 14. Furthermore, it is possible for planar terminal plates to be provided at the ends of the heat exchanger 10 or for the outermost plates, in each case, to be of planar design on one side.

Figure 7:
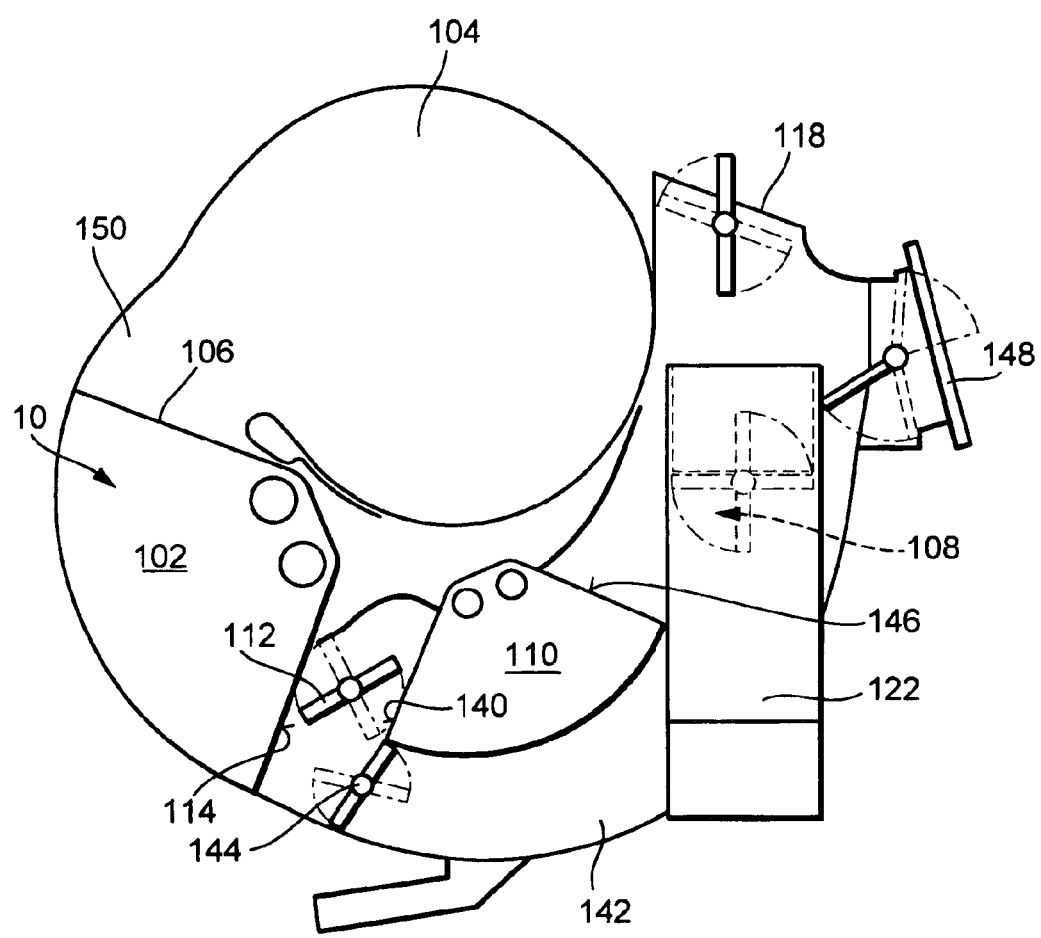
FIG. 7 is a schematic cross-sectional view of an air-conditioning system according to the invention with a heat exchanger according to the invention being employed as an evaporator.

The heat exchanger 10 according to the invention is preferably used in heating or air-conditioning systems, in particular in air-conditioning systems in which $CO_2$ is used as the refrigerant. FIG. 7 illustrates an exemplary embodiment in which the heat exchanger 10 is used as the evaporator 102. Air which is to be conditioned is fed directly, by a radial blower 104 (not shown in more detail) to the inflow surface 106 of the evaporator 102. In the evaporator 102, the air is cooled and, at the same time, diverted through approximately 90°. Cold air which emerges from the evaporator 102 can be fed via a mixing flap 112 to a heater 110, and from the heater 110 can be fed to an air-mixing space 108 as warm air. In the exemplary embodiment illustrated, the heater 110 is also designed utilizing the plate structure in accordance with the invention. Cold air can bypass the heater 110 via a bypass flap 144 and can be fed to the air-mixing space 108.

In the air-mixing space 108, the warm air and the cold air are mixed, in order to obtain air of a desired temperature. A defrosting air passage 118, a footwell air passage 122 and an air passage 148 branch off from the air-mixing space 108, to outlet grilles in the central plane of the vehicle. The air passages which branch off from the air-mixing space 108 can in each case be closed off by means of air flaps.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A heating or air-conditioning system for a motor vehicle including
    at least one lightweight, stacked plate-type heat exchanger, comprising:
        a plurality of first and second stacked plate pairs, said pairs comprised in each case of two stacked plates which are comprised of relatively thin stamped plates and which form and define between them at least one first flow passageway for a first heat exchange medium; and
        a plurality of parallel second flow passageways for a second heat exchange medium, said second flow passageways being defined between two adjacent plate pairs, wherein the second flow passageways are formed in each case by one plate from adjacent plate pairs; wherein said second flow passageways terminate at an inflow surface for the second medium and at an outlet surface for the second medium, and said surfaces are arranged at an angle with respect to one another; and wherein the second flow passageways are shaped in the form of an arc extending from the inflow surface to the outflow surface.

2. A heating or air-conditioning system as claimed in claim 1, wherein the heat exchanger comprises an evaporator, a refrigerant which operates at a pressure of carbon dioxide flows through the first flow passageways as a refrigerant and air flows through said second passageways.

3. A heating or air-conditioning system as claimed in claim 2, wherein the heat exchanger comprises second passageways having a configuration to divert the air through approximately 90° from inlet to outlet.

4. A motor vehicle comprising a heating or air-conditioning system as defined in claim 1.

5. A heating or air-conditioning system for a motor vehicle as defined in claim 1, comprising a plurality of said first flow passageways for the first heat exchange medium, wherein said first flow passageways are connected in parallel hydraulically and are of approximately equal length.

6. A heating or air-conditioning system for a motor vehicle as defined in claim 5, wherein at least some of the first flow passageways run in meandering pattern in at least certain regions.

7. A heating or air-conditioning system for a motor vehicle as defined in claim 6, wherein pattern for the first flow passageways is designed to provide a temperature over the surface of the plate pair that is essentially uniform.

8. A heating or air-conditioning system for a motor vehicle as defined in claim 1, wherein the plates have webs projecting from their second side, and wherein adjacent plates are connected to one another by means of the webs projecting from the second sides so as to form the second flow passageways.

9. A heating or air-conditioning system for a motor vehicle as defined in claim 8, wherein the distal ends of opposing webs projecting from the second sides are connected to one another to form the second flow passageways.

10. A heating or air-conditioning system for a motor vehicle as defined in claim 1, wherein the second flow passageways are shaped in an arc of a circle.

11. A heating or air-conditioning system for a motor vehicle as defined in claim 1, wherein respectively adjacent plates are substantially mirror-symmetrical and complementary to one another in their connecting regions.

12. A heating or air-conditioning system for a motor vehicle as defined in claim 1, wherein the plates, at their downstream end of the second flow passageways comprise means, including indentations, for draining off water of condensation.

13. A heating or air-conditioning system for a motor vehicle as defined in claim 1, wherein adjacent plates are brazed to one another.

14. A heating or air-conditioning system for a motor vehicle as defined in claim 1, wherein the plates comprise a relatively lightweight material.

15. A heating or air-conditioning system for a motor vehicle as defined in claim 14, wherein the plates comprise aluminum.

16. A heating or air-conditioning system for a motor vehicle including
   at least one lightweight, stacked plate-type heat exchanger, comprising:
      a plurality of first and second stacked plate pairs, said pairs comprised in each case of two stacked plates which are comprised of relatively thin stamped plates and which form and define between them at least one first flow passageway for a first heat exchange medium; and
      a plurality of second parallel flow passageways for a second heat exchange medium, said second flow passageways being defined between two adjacent plate pairs, wherein the second flow passageways are formed in each case by one plate from adjacent plate pairs; wherein said stacked plates and said heat exchanger have the shape of an arcuate sector, including a first radial surface defining an inflow surface for said second flow passageways and a second radial surface defining an outlet surface for the second flow passageways, whereby said surfaces are arranged at an angle with respect to one another; and wherein the second flow passageways are shaped in the form of an arc extending from the inflow surface to the outflow surface.

17. A heating or air-conditioning system for a motor vehicle as defined in claim 16, comprising a plurality of said first flow passageways for the first heat exchange medium, wherein said first flow passageways are connected in parallel hydraulically and are of approximately equal length.

18. A heating or air-conditioning system for a motor vehicle as defined in claim 17, wherein at least some of the first flow passageways run in meandering pattern in at least certain regions.

19. A heating or air-conditioning system for a motor vehicle as defined in claim 18, wherein the pattern for the first flow passageways is designed to provide a temperature over the surface of the plate pair that is essentially uniform.

20. A heating or air-conditioning system for a motor vehicle as defined in claim 16, wherein the plates have passageway-like recesses on a first side, and adjacent plates, which form a plate pair, are connected to one another by means of their first sides, in order to form the first flow passageways defined by the recesses.

21. A heating or air-conditioning system for a motor vehicle as defined in claim 20, wherein the plates have webs projecting from their second side, and adjacent plates are connected to one another by means of the webs so as to form the second flow passageways.

22. A heating or air-conditioning system for a motor vehicle as defined in claim 21, wherein the distal ends of opposing webs are connected to one another to form the second flow passageways.

23. A heating or air-conditioning system for a motor vehicle as defined claim 16, wherein the second flow passageways are shaped in an arc of a circle.

24. A heating or air-conditioning system for a motor vehicle as defined in claim 16, wherein respectively adjacent plates are substantially mirror-symmetrical and complementary to one another in their connecting regions.

25. A heating or air-conditioning system for a motor vehicle as defined claim 16, wherein the plates comprise a relatively lightweight material.

26. A heating or air-conditioning system for a motor vehicle as defined in claim 25, wherein the plates comprise aluminum.

27. A heating or air-conditioning system for a motor vehicle as defined in claim 16, wherein the plate pairs further comprise inlet and outlet opening for the first flow passageways, wherein the inlet and outlet opening are both located on the radially inner portion of the plate pairs.

28. A heating or air-conditioning system for a motor vehicle as defined in claim 16, wherein the stacked plates have the form of an arcuate sector that is truncated at its radially inner portion.

29. A motor vehicle comprising a heating or air-conditioning system as defined in claim 16.

30. A heating or air-conditioning system for a motor vehicle including a lightweight, stacked plate-type heat exchanger, comprising:
   a plurality of first and second stacked plate pairs, said pairs comprised in each case of two stacked plates which are comprised of relatively thin stamped plates and which form and define between them at least one first flow passageway for a first heat exchange medium; and a plurality of second parallel flow passageways for a second heat exchange medium, said second flow passageways being defined between two adjacent plate pairs, wherein the second flow passageways are formed in each case by one plate from adjacent plate pairs; wherein the plates have passageway-like recesses on a first side, and adjacent plates, which form a plate pair, are connected to one another by means of their first sides, in order to form the first flow passageways defined by the recesses; and wherein the plates have webs projecting from their second side, and adjacent plates are connected to one another by joining distal ends of the webs so as to form the second flow passageways and said second flow passageways are shaped in the form of an arc extending from an inflow surface to an outflow surface.

31. A lightweight, stacked plate-type heat exchanger suitable for use in an air-conditioning system for an automotive vehicle, comprising:

a plurality of first and second stacked plate pairs, said pairs comprised in each case of two stacked plates which are comprised of relatively thin stamped plates and which form and define between them at least one first flow passageway for a first heat exchange medium, wherein the plates have passageway-like recesses on a first side, and adjacent plates, which form a plate pair, are connected to one another by means of their first sides, in order to form the first flow passageways defined by the recesses;

a plurality of parallel second flow passageways for a second heat exchange medium, said second flow passageways being defined between two adjacent plate pairs, wherein the second flow passageways are formed in each case by one plate from adjacent plate pairs; wherein said second flow passageways terminate at an inflow surface for the second medium and at an outlet surface for the second medium, and said surfaces are arranged at an angle with respect to one another; and wherein the second flow passageways are shaped in the form of an arc extending from the inflow surface to the outflow surface; and at least one tongue-like web and at least one groove-like channel arranged alongside each of the recesses.

* * * * *